W. HASTER.
BEET HARVESTING MACHINE.
APPLICATION FILED MAR. 14, 1913.
1,077,978.
Patented Nov. 11, 1913.
3 SHEETS—SHEET 2.
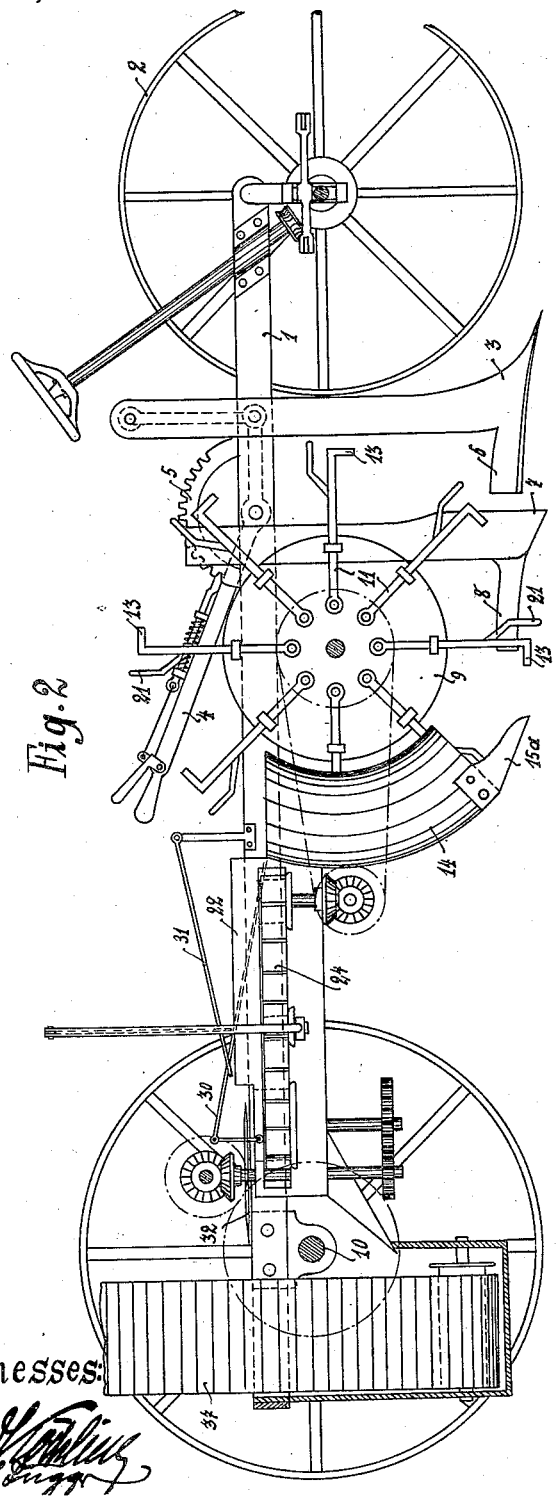
Witnesses:
Inventor:
Wilhelm Haster

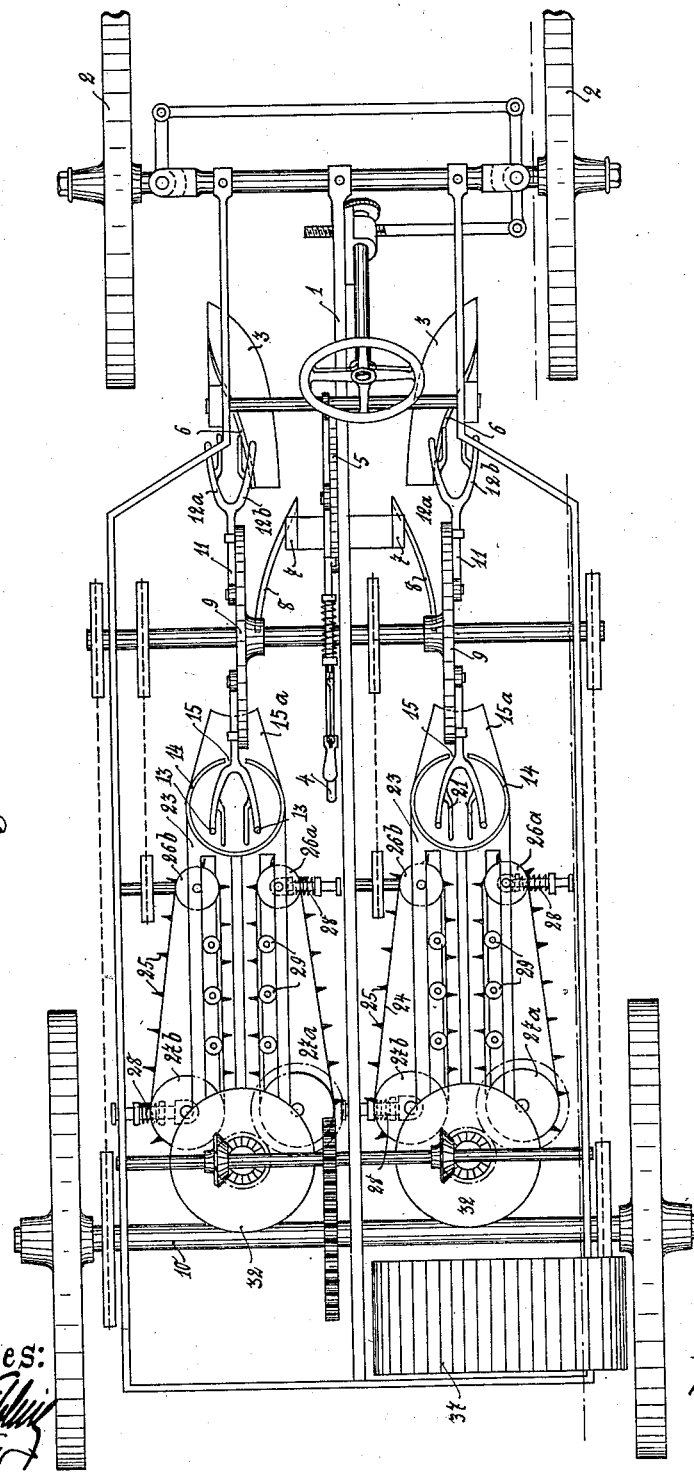

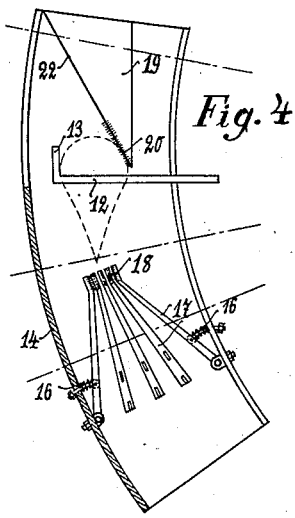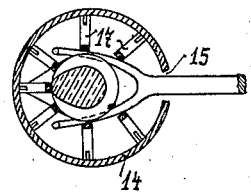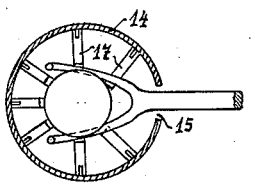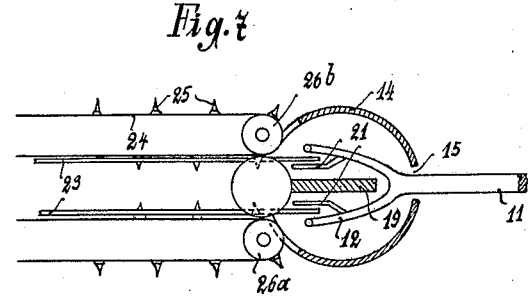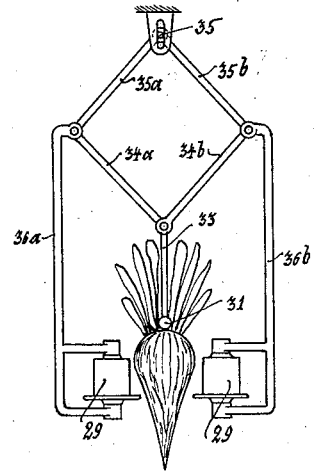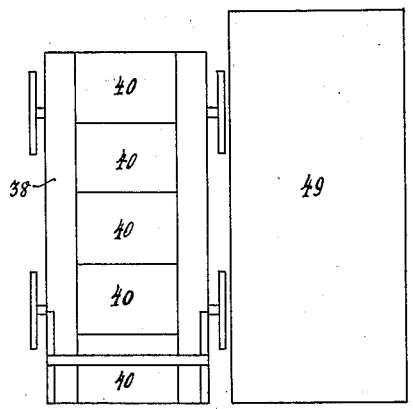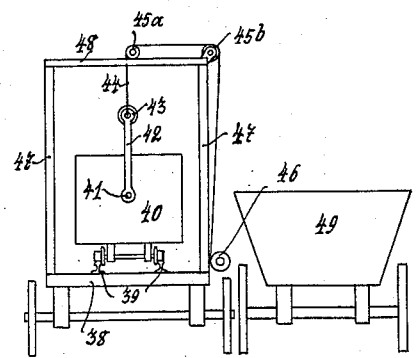

UNITED STATES PATENT OFFICE.

WILHELM HASTER, OF SIEGEN, GERMANY.

BEET-HARVESTING MACHINE.

1,077,978.  Specification of Letters Patent.  Patented Nov. 11, 1913.

Application filed March 14, 1913. Serial No. 754,309.

*To all whom it may concern:*

Be it known that I, WILHELM HASTER, a subject of the Emperor of Germany, residing at Siegen, Westphalia, Germany, have invented an Improved Beet-Harvesting Machine, of which the following is a specification.

The present invention relates to a beet harvesting machine, of the kind provided with a share for breaking up the soil, with revolving grippers for picking up the beets, and with endless conveying bands for taking the latter past the horizontal cutting wheel, and consists in the various devices, as hereinafter set forth and claimed, for guiding the beets to the grippers, for cleaning them and maintaining them in a vertical position, as well as for adjusting them relative to the cutting wheel in accordance with their thickness.

In the accompanying drawings the invention is illustrated, Figure 1 representing a diagrammatic plan of the machine, Fig. 2, a side view of the same, partly in section, Fig. 3, a diagrammatic view, showing how the beets are guided to the grippers, Fig. 4, a vertical section of a cleaning and righting device, Fig. 5, a cross-section of the same on the lowermost dotted line of Fig. 4, Fig. 6, a cross-section on the middle line, Fig. 7, a cross-section on the uppermost dotted line of Fig. 4, Fig. 8, a view of the device for adjusting the beets relative to the cutter, Fig. 9, a plan of the collecting and transport wagon, and Fig. 10, an end view of Fig. 9.

A wheeled frame 1 carries just behind its front wheels 2 two plow shares 3 adapted to break up the ground and loosen the beets. A lever system is employed for adjusting the shares vertically, the operating lever 4 being normally secured, in known manner, to a toother segment 5 on which a scale is provided. The front wheels are preferably mounted on pivoted axle-trees so that the machine can be steered in the manner of a motor-car. Each share 3 works on a separate row of beets and has behind it a revolving gripper 9 adapted to pick up the beets from the ground. A curved guide-plate 6 on the share 3 guides the beets away from the gripper path, as shown in Fig. 3, so that the gripping arms do not get entangled in the leaves. A colter 7, arranged behind the share 3, is fitted with a guide-plate 8 which guides the beets back into the gripper path, in position for being picked up by the gripper arms.

The grippers which, just as the other movable elements of the machine, are driven from the rear axle 10, are fitted with radiating arms 11 the outer ends of which are branched out into two fork-members 12ª and 12ᵇ. Each fork-member has on its outermost end a right-angled bend 13 set in the direction of the movement. Another pair of fork members 21 are connected to the members 12ª and 12ᵇ from which they are set off in a rearward direction. The outer parts of the members 21 are parallel and are set closer together than the adjacent parts of the members 12ª and 12ᵇ which diverge outward. The forks are adapted to pass through a cylindrical casing 14 which is concentric with the gripper and which has a slit 15 forming a passage for the arms 11. From the lower edge of the casing 14 a share-like plate 15ª projects so as to take slightly into the ground and receive the beets from the guide 8, each beet being held by the plate until it is picked up by one of the gripper arms. The beets are gripped between the bends 13 and passed through the casing 14 within which, as shown in Fig. 4, a plurality of arms 17 are pivotally arranged. Springs 16 act on the arms 17 and hold their free ends normally assembled in about the center of the casing. The fork 12 and the beet must pass between the assembled arms 17 which close around the beet and turn the same within the fork into an upright position, the narrow part of the beet being gripped by the fork 21. Moreover, the arms 17 clear the beet of earth for which purpose they are preferably provided on their abutting ends with brushes 18. In the upper part of the casing 14 a wedge 19 is arranged which engages the beet with its inclined edge 22 and guides it onto two parallel supporting plates 23 which project through an aperture into the casing. The wedge 19 as well as the ends of the plates 23 are all adapted to mesh with the fork-members 12 and 21, as shown in Fig. 7. A brush 20 is provided on the wedge 19 for cleaning the part of the beet which was protected by the forks from contact with the brushes 18.

After the beet has been delivered onto the plates 23 by the joint action of the forks and the wedge 19, it is gripped between studs 25 connected to two endless conveying bands 24 and working in slots in the plates 23. The bands, which convey the beets to a horizontal cutting wheel 32, are guided on rollers 26$^a$, 26$^b$ and 27$^a$, 27$^b$ rotating about vertical axes. The rollers 26$^a$ and 27$^b$ are adjustable and pressed by springs 28 which urge the bands toward one another, the bands having thus a tendency to adjust themselves to beets of different thicknesses. The inner stretches of the bands are moreover supported by spring-pressed rollers 29 which press the same against the beets so that alternate small and large beets will be retained by the bands and urged upward by virtue of their tapering shape. Above the conveying bands two wires 30 are stretched in a longitudinal direction. These wires are inclined against the traveling direction of the bands and are adapted to gather up and raise the leaves from the beets. A pivoted rod 31 is arranged between the wires 30 and inclined in the opposite direction, its free end being disposed in the neighborhood of the cutting-wheel 32 and adapted to bear against the head of the beets. One pair of the rollers 29 is connected, as shown in Fig. 8, to levers 36$^a$ and 36$^b$ suspended from a pivot 35. Connected to these levers is a toggle-joint 34$^a$, 34$^b$, 35$^a$, 35$^b$ which controls the rod 31 through the medium of a connecting rod 33. If a thick beet should pass between the rollers 29 and separate the latter, the movement will be transmitted to the toggle-joint which raises the arm 31 and allows the beet to move upward so as to be cut in a correspondingly lower position. Whenever a thin beet passes between the rollers, the action of the toggle-joint will be to press such beet down and cause it to be cut in a high position. This adjustment of the beets relative to the cutter is essential, since, as is well-known, the head of a thin beet is richer in sugar than that of a thick one and therefore ought to be spared as much as possible. It is also essential for the cutting process that the beet should be brought into a vertical position, and this is attained by the righting elements 17 as previously explained.

The cutting wheel 32, which is constructed and operated in known manner, throws away the cut-off portion of the beets, while the beets themselves are delivered by the bands onto a conveyer 37. From the latter the materials are conveyed in any suitable manner into boxes 40 adapted to run on rails 39 on a separate van 38. Arms 42, pivoted to the boxes 40 at 41, carry on their free ends rollers 43 by means of which the boxes can be suspended and run on cross-rails 48 carried in an elevated position on a frame 47. Being thus supported on the rails 48 the boxes can be moved to one side and tipped about the pivot 41 for delivering their contents into a collecting van 49.

For raising the boxes onto the rails 48, winches 46 are provided from which ropes 44 are carried over deflecting rollers 45$^a$ and 45$^b$ to the arms 42.

The constructional details of the machine may be varied without departing from the spirit of the invention.

I claim:—

1. A beet harvesting machine comprising a wheeled frame, a vertically adjustable share held in said frame so as to break up the soil, a revolving gripper arranged behind such share so as to pick up the beets, a guide-plate on said share adapted to move the beets away from the gripper path to prevent the gripper arms from getting entangled in the leaves, another guide-plate adapted to guide the beets back into the gripper path in position for being caught by the arms, a pair of coacting conveyer bands, means for transferring the beets from the gripper to said conveying bands, means for righting the beets and clearing them of earth before they are delivered to said conveying bands, a cutting wheel for heading the beets while held between the conveying bands, and means for adjusting the beets relative to the cutter according to their thickness, substantially as and for the purpose set forth.

2. A beet harvesting machine, comprising a wheeled frame, a vertical adjustable share held by said frame so as to break up the soil, a revolving gripper arranged behind said share, said gripper having forked arms adapted to pick up the beets with their forks, means for guiding the beets to the forks without the latter being entangled with the leaves, a casing arranged concentrically with the gripper so that the forks are compelled to pass the beets through the same, pivoted spring-actuated arms arranged in said casing so as to abut against the beets, clear them of earth and turn them in the forks into an upright position, a pair of conveying bands, means for transferring the beets, while in an upright position, from the forks to the conveying bands, a cutter for heading the beets while held between the bands, and means for adjusting the beets vertically relative to the cutter in accordance with their thickness, substantially as and for the purpose set forth.

3. A beet harvesting machine, comprising a wheeled frame, a vertically adjustable share held by said frame so as to break up the soil, a revolving gripper arranged behind said share, said gripper having forked arms adapted to pick up the beets with their forks, means for guiding the beets to the forks without the latter being entangled in the leaves, a casing arranged concentrically with the gripper so that the forks are compelled to pass the beets through the same, pivoted spring-actuated arms arranged in said casing so as to abut against the beets, clear them of earth and turn them in the forks into an upright position, a pair of coacting conveying bands, a wedge arranged in the casing so as to engage the beets and guide them, while in a vertical position, from the forks into connection with the conveying bands, brushes arranged on said wedge for cleaning the beets, a cutter for heading the beets while held between the bands, and means for adjusting the beets relative to the cutter in accordance with their thickness, substantially as and for the purpose set forth.

4. A beet harvesting machine, comprising a wheeled frame, a vertically adjustable share held by said frame so as to break up the soil, a revolving gripper arranged behind said share, said gripper having forked arms adapted to pick up the beets with their forks, means for guiding the beets to the forks without the latter being entangled in the leaves, a casing arranged concentrically with the gripper so that the forks are compelled to pass the beets through the same, pivoted spring-actuated arms arranged in said casing so as to abut against the beets, clear them of earth and turn them in the fork into an upright position, a pair of plates arranged so as to project into the casing and mesh with the forks, a wedge arranged in the casing so as to guide the beets from the forks to the plates, a pair of coacting conveying bands having studs adapted to take through slots in the plates so as to carry the beets with them, a cutter for heading the beets while held between the bands, and means for adjusting the beets relative to the cutter in accordance with their thickness, substantially as and for the purpose set forth.

5. A beet harvesting machine, comprising a wheeled frame, a share held in said frame so as to break up the soil, a gripper arranged behind said share so as to pick up the beets, a pair of coacting conveying bands guided on vertically disposed rollers, means for transferring the beets from the gripper to the conveying bands, means for clearing the beets of earth and righting them before they are transferred to the bands, spring-actuated rollers arranged so as to clamp the inner stretches of the bands against the tapering sides of the beets and urge them upward, a pair of levers connected to said clamp rollers, a toggle-joint controlled by said levers, a pivoted arm held by the toggle-joint so as to bear against the heads of the beets and adjust the latter vertically as the position of the clamp rollers is varied by the thickness of such beets, a cutter arranged so as to head the beets after the latter have been thus adjusted, and a pair of wires stretched over and along the conveying bands in an inclined position so as to engage the leaves of the beets and raise them out of contact with the cutter.

WILHELM HASTER.

Witnesses:
Louis Vandorn,
Gertrud Schäfer